E. JOSSE & W. GENSECKE.
APPARATUS FOR REMOVING GASES AND VAPORS FROM SURFACE CONDENSERS.
APPLICATION FILED OCT. 12, 1909.
971,505.
Patented Sept. 27, 1910.
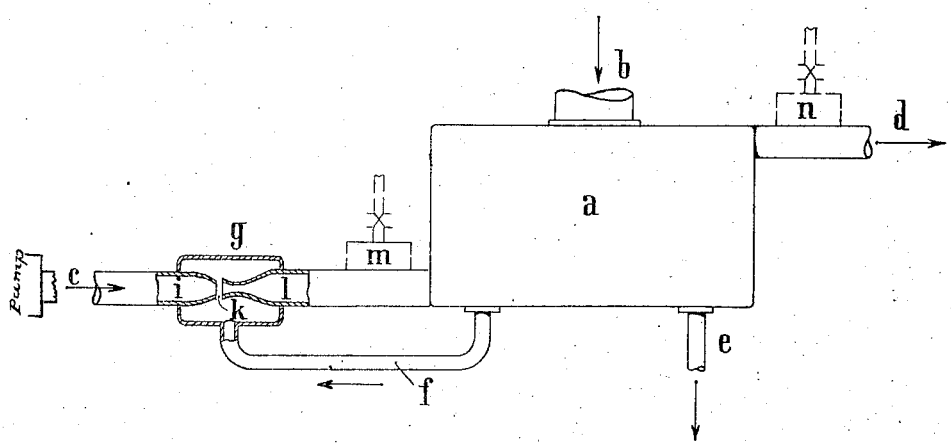

UNITED STATES PATENT OFFICE.

EMIL JOSSE, OF BERLIN, AND WILHELM GENSECKE, OF CHARLOTTENBURG, GERMANY.

APPARATUS FOR REMOVING GASES AND VAPORS FROM SURFACE CONDENSERS.

971,505.  Specification of Letters Patent. Patented Sept. 27, 1910.

Application filed October 12, 1909. Serial No. 522,344.

*To all whom it may concern:*

Be it known that we, EMIL JOSSE, of 158 Uhlandstrasse, Berlin, Germany, and WILHELM GENSECKE, of 26 Leibnitzstrasse, Charlottenburg, Germany, both subjects of the German Emperor, have invented certain new and useful Improvements in Apparatus for Removing Gases and Vapors from Surface Condensers, of which the following is a specification.

This invention relates to an improved apparatus for removing gases and vapors from surface condensers, and consists substantially in providing means for giving such a high velocity at any point to the cooling medium which is made to circulate in any desired manner, that the mixture of gases or vapors to be extracted from the surface condenser is sucked away and drawn along by the cooling medium.

In the accompanying drawing $a$ is a surface condenser, in which the gases entering at $b$ are to be condensed. The cooling medium for effecting the condensation is forced by a force pump, (not shown), through the pipe $c$ into the cooling tubes or the like of the surface condenser and leaves the latter through the pipe $d$.

The liquid condensed in the apparatus is sucked away through the pipe $e$ in any known manner, while the gases and vapors (such as air leakage, uncondensed steam and the like) are sucked away from the condenser $a$ through the pipe $f$ by the improved means hereinafter described.

A suction device is provided in the cooling medium supply pipe at $g$, in front of the condenser $a$. By means of a contraction in the supply pipe forming a nozzle $i$, the cooling medium receives a velocity which is high enough to draw along the gases and vapors to be extracted from the surface condenser. The kinetic energy of the mixture of cooling medium and extracted substances at the point $k$ is now reconverted into pressure in the diffusing pipe $l$ and the mixture now flows through the cooling tubes of the surface condenser $a$ and out through the outlet $d$. After this compression has taken place at $l$ a separation of the extracted substances not dissolved in the cooling medium may be performed at any desired point in front of, inside, or behind the vacuum apparatus, for example at $m$ or $n$. Instead of the whole quantity of the cooling medium, only a part of the same need be used for extraction of the gaseous mixture, the apparatus $g$ being in this case mounted in the pipe carrying the partial supply.

In case it is not required to draw off the liquid condensed in the apparatus, separately through the pipe $e$ (for instance by means of a centrifugal pump) this liquid together with the uncondensed gases or vapors may be sucked away directly by means of the suction device at $g$. In this case the cooling medium emerging from the nozzle $i$ with a high velocity sucks the mixture of condensed liquid and uncondensed gases and vapors from the vacuum apparatus or condenser directly through the pipe $f$, so that the pump for the condensed liquid and the pipe $e$ are not required.

Having now described our invention what we claim as new and desire to secure by Letters Patent is:

1. In apparatus for removing gases and vapors from a surface condenser, the combination with said condenser, of a cooling medium supply pipe connected to the cooling medium inlet of said condenser, means for delivering cooling medium under pressure into said cooling medium supply pipe, an inducing device in said cooling medium supply pipe, a diffuser behind said inducing device in said cooling medium supply pipe, a chamber surrounding said inducing device, and a connecting pipe connecting the condenser vapor outlet to said chamber, whereby the gases and vapors not condensed by said cooling medium in its passage through said condenser are drawn from the latter through said connecting pipe by the inducing action of said cooling medium passing through said inducing device and carried along by it through said cooling medium supply pipe into and through the cooling medium space in the condenser and out through the cooling medium outlet of the condenser, as set forth.

2. In apparatus for removing gases and vapors from a surface condenser, the combination with said condenser, of a cooling medium supply pipe connected to the cooling medium inlet of said condenser, a force pump for delivering cooling medium under pressure into said cooling medium supply pipe, an inducing device in said cooling medium supply pipe, a diffuser behind said inducing device in said cooling medium supply pipe, a chamber surrounding said inducing device, and a connecting pipe connecting the condenser vapor outlet to said chamber, whereby the gases and vapors not condensed by said cooling medium in its passage through said condenser are drawn from the latter through said connecting pipe by the inducing action of said cooling medium passing through said inducing device and carried along by it through said cooling medium supply pipe into and through the cooling medium space in the condenser and out through the cooling medium outlet of the condenser, as set forth.

3. In apparatus for removing gases and vapors from a surface condenser, the combination with said condenser, of a cooling medium supply pipe connected to the cooling medium inlet of said condenser, a force pump for delivering cooling medium under pressure into said cooling medium supply pipe, an inducing device in said cooling medium supply pipe, a diffuser behind said inducing device in said cooling medium supply pipe, a chamber surrounding said inducing device, and a connecting pipe connecting the condenser vapor outlet to said chamber, and a suction device located behind said diffuser in the path of said cooling medium, whereby the gases and vapors carried along by said cooling medium and not dissolved in it are removed from said cooling medium, as set forth.

In testimony whereof we have signed our names to this specification in the presence of two subscribing witnesses.

EMIL JOSSE.
WILHELM GENSECKE.

Witnesses:
 HENRY HASPER,
 WOLDEMAR HAUPT.